US010518793B2

(12) United States Patent
Churchvara et al.

(10) Patent No.: US 10,518,793 B2
(45) Date of Patent: Dec. 31, 2019

(54) CART WITH REMOVABLE WHEEL BASE

(71) Applicant: Veltek Associates, Inc., Malvern, PA (US)

(72) Inventors: Jeffrey Churchvara, Downingtown, PA (US); Arthur L. Vellutato, Jr., Malvern, PA (US); Yefim Gudesblat, Exton, PA (US); Vladislav Gudesblat, Exton, PA (US)

(73) Assignee: Veltek Associates, Inc., Malvern, PA (US)

( * ) Notice: Subject to any disclaimer, the term of this patent is extended or adjusted under 35 U.S.C. 154(b) by 122 days.

(21) Appl. No.: 14/979,330

(22) Filed: Dec. 22, 2015

(65) Prior Publication Data

US 2016/0185371 A1    Jun. 30, 2016

Related U.S. Application Data

(60) Provisional application No. 62/096,648, filed on Dec. 24, 2014, provisional application No. 62/109,873, filed on Jan. 30, 2015.

(51) Int. Cl.
*B62B 3/04* (2006.01)
*B62B 3/00* (2006.01)
(Continued)

(52) U.S. Cl.
CPC ............... *B62B 3/005* (2013.01); *B62B 3/02* (2013.01); *B62B 3/04* (2013.01); *B62B 3/108* (2013.01); *B62B 3/1476* (2013.01)

(58) Field of Classification Search
CPC ..... B62B 1/20; B62B 1/204; B62B 2202/022; B62B 2202/028; B62B 2205/20;
(Continued)

(56) References Cited

U.S. PATENT DOCUMENTS 274,258 A    3/1883 Bedell
1,750,129 A    3/1930 Romine
(Continued)

FOREIGN PATENT DOCUMENTS

DE    202009004554 U1    7/2009
DE    202013102199 U1    6/2013
(Continued)

OTHER PUBLICATIONS

International Preliminary Report on Patentability issued in PCT/US2015/067110 dated Jun. 27, 2017.
(Continued)

*Primary Examiner* — John D Walters
*Assistant Examiner* — James Triggs
(74) *Attorney, Agent, or Firm* — Blank Rome LLP

(57) ABSTRACT

A cart transports items between a controlled environment (e.g., a clean room or an airlock to a clean room) and an uncontrolled environment. The cart has a main body that carries the items, and a removable and interchangeable wheel base assembly. A first wheel base assembly is located in the uncontrolled environment and a second wheel base assembly is located in the controlled environment. The user can push the cart (with the first wheel base assembly) up to the second wheel base assembly at the boundary between the controlled environment and the uncontrolled environment. The user then unlocks the main body from the first wheel base assembly, slides the main body onto the second wheel base assembly, and locks the main body to the second wheel base assembly. An autoclavable storage and transport cart can hold several wheel base assemblies.

17 Claims, 9 Drawing Sheets

(51) Int. Cl.
 *B62B 3/02* (2006.01)
 *B62B 3/10* (2006.01)
 *B62B 3/14* (2006.01)
(58) Field of Classification Search
 CPC ............ B62B 2205/33; B62B 2206/06; B62B 2301/10; B62B 2501/04; B62B 2501/065; B62B 3/002
 See application file for complete search history.

(56) References Cited

U.S. PATENT DOCUMENTS

| | | | |
|---|---|---|---|
| 2,507,732 A | | 5/1950 | Morgan |
| 2,790,196 A | | 4/1957 | Rideout et al. |
| 3,023,021 A | | 2/1962 | Fricke et al. |
| 3,125,353 A | | 3/1964 | Gohmann |
| 3,137,250 A | | 6/1964 | Hutchinson |
| 3,521,568 A | * | 7/1970 | Toshiyuki ............... B61B 10/04 104/172.2 |
| 3,641,598 A | * | 2/1972 | Feldstein ................ A47D 7/02 403/321 |
| 3,698,733 A | * | 10/1972 | Isaacs .................... B62B 3/002 206/511 |
| 3,759,538 A | | 9/1973 | Fabiano |
| 3,869,052 A | | 3/1975 | Leahy |
| 3,934,895 A | | 1/1976 | Fox |
| 4,109,926 A | | 8/1978 | Lane |
| 4,222,580 A | | 9/1980 | Krokonko |
| 4,354,791 A | | 10/1982 | Antonellis |
| 4,436,700 A | * | 3/1984 | Erickson ................ B01L 9/543 206/443 |
| 4,557,201 A | | 12/1985 | Webb, Jr. |
| 4,670,227 A | | 6/1987 | Smith |
| 4,687,404 A | | 8/1987 | Seiz et al. |
| 4,819,767 A | | 4/1989 | Laird |
| 5,072,960 A | | 12/1991 | Sperko |
| 5,175,014 A | | 12/1992 | Brockwell et al. |
| 5,236,066 A | | 8/1993 | O'Neal et al. |
| 5,312,004 A | | 5/1994 | Krummell et al. |
| 5,421,604 A | * | 6/1995 | Wu ......................... B62B 1/045 280/47.26 |
| 5,735,367 A | | 4/1998 | Brubaker |
| 5,758,888 A | | 6/1998 | Burgan et al. |
| 6,027,190 A | | 2/2000 | Stewart |
| 6,042,127 A | | 3/2000 | Rupolo |
| 6,095,348 A | * | 8/2000 | Karashima ............. A47F 5/103 211/175 |
| 6,247,769 B1 | | 6/2001 | Spitzer et al. |
| 6,394,743 B1 | * | 5/2002 | Marsden ................ B62B 3/008 280/79.3 |
| 6,398,283 B1 | | 6/2002 | Knudtson et al. |
| 6,416,143 B1 | * | 7/2002 | Janson .................. A47B 53/02 312/199 |
| 6,695,564 B2 | | 2/2004 | Pfisterer |
| 7,185,899 B2 | * | 3/2007 | Thiede .................. A47B 46/00 211/189 |
| 7,673,889 B2 | * | 3/2010 | Wells .................... B60P 1/6463 187/244 |
| 8,104,775 B2 | | 1/2012 | Hadar et al. |
| 9,108,661 B2 | | 8/2015 | Suess |
| 2002/0109368 A1 | | 8/2002 | Mink et al. |
| 2003/0205875 A1 | | 11/2003 | Ondrasik et al. |
| 2003/0205878 A1 | | 11/2003 | Martis et al. |
| 2004/0011000 A1 | | 1/2004 | Lagerstedt |
| 2004/0207168 A1 | | 10/2004 | Raab et al. |
| 2005/0012286 A1 | | 1/2005 | Woodrow |
| 2007/0272518 A1 | | 11/2007 | Gaarden et al. |
| 2008/0042378 A1 | * | 2/2008 | Dick ...................... B62B 3/006 280/29 |
| 2012/0194050 A1 | | 8/2012 | Suess |
| 2012/0315117 A1 | * | 12/2012 | Gilland ................ B66F 9/0754 414/535 |

FOREIGN PATENT DOCUMENTS

| | | |
|---|---|---|
| EP | 0314176 A2 | 5/1989 |
| GB | 674662 A | 6/1952 |
| JP | 58-095735 U | 10/1955 |
| JP | 57-73269 | 5/1982 |
| JP | 58-95735 U | 6/1983 |
| JP | 60-6667 | 1/1985 |
| JP | 1995-231523 A | 8/1995 |
| JP | 2005125858 A | 5/2005 |
| KR | 10-2012-0061892 A | 7/2012 |

OTHER PUBLICATIONS

International Search Report and Written Opinion issued in PCT/US2015/067110 dated May 20, 2016, 12 pages.
English-language Summary of Office Action for KR-10-2017-7014768, dated Feb. 1, 2018, 1 page.
English-language Translation of Japanese Office Action for JP2017-534327, dated May 16, 2018, 3 pages.
Korean Office Action for KR-10-2017-7014768, dated Sep. 3, 2018, 8 pages.
Examination Report for New Zealnd Application No. 732617, dated Jul. 25, 2018, 3 pages.
IPER for PCT/US2017/037923 dated Jan. 3, 2019 (7 pages).
Supplementary European Search Report for EP15874251 dated Oct. 9, 2018.
International Search Report and Written Opinion for PCT/US18/38712, dated Aug. 3, 2018, 11 pages.
English-language translation of Office Action for Chinese Patent Application No. 201580069038.7, dated Sep. 4, 2018, 5 pages.
Written Opinion for SG Application No. 11201703153S, dated Mar. 7, 2019, 4 pages.
International Search Report & Written Opinion dated May 20, 2016, 12 pages.

* cited by examiner

CART WITH REMOVABLE WHEEL BASE

RELATED APPLICATIONS

This application claims the benefit of U.S. Provisional Application No. 62/096,648, filed Dec. 24, 2014, and 62/109,873, filed Jan. 30, 2015. The entire contents of those applications are incorporated herein by reference.

FIELD OF THE INVENTION

The present invention relates to the field of clean room equipment. More particularly, the present invention relates to the facilitation of transport for sterile equipment from a non-sterile environment to a sterile environment and vice versa.

BACKGROUND OF THE INVENTION

A controlled environment (such as a clean room) is an area or environment in which the level of contaminants or particles is controlled, such as by filtering particulate matter from air that enters the room. Controlled environments have low levels of contaminants or particles, and are used to manufacture certain products and conduct research. These controlled environments are used to ensure that organic and inorganic contaminants from the outside environments do not compromise the goods or equipment being manufactured or utilized. However, it can be difficult to transport into the controlled environment, the various items (such as supplies, raw materials, etc.) that are needed in the controlled environment to assist in the manufacture, without contaminating the controlled environment or otherwise introducing particles into the controlled environment.

Clean rooms can also use such features as positive pressure and humidity controls to optimize the environment for the task for which they have been designed. Clean rooms can have a variety of sizes, and can also have an airlock or staging area formed outside of the entry point. The airlock or staging area sequesters the air inside the clean room from the outside environment. Clean rooms are currently classified using filtration criteria that examines the number and size of particles admitted in a given air volume. Known clean room standards in the United States include US FED 209E classes, ISO 14644-1 classes, and ISO 14644-2 classes. Other countries may use separate standards or guidelines.

Autoclaving is one technique for cleaning the goods and equipment that are transported into the controlled environment. An autoclave is a device that is used to sterilize goods and equipment through the use of pressure and/or heat in the form of steam or superheated water. Autoclaving can also be carried out in a vacuum. Autoclaves can have a variety of sizes, depending on the media to be sterilized. Because the goods and equipment in the autoclave are subjected to high levels of heat, pressure, and moisture, any media subjected to such treatment must be able to withstand both.

Clean room personnel will often use carts to transport items to/from a clean room. However, the cart cannot enter the clean room because the wheels attract dirt that would introduce undesirable particles into the clean room. Consequently, personnel must stop the cart outside the clean room entry point (or inside the staging area), then manually transfer trays and/or goods from the cart to inside the sterile environment. A second cart can sometimes be provided inside the clean room, and the goods can be transferred to/from the cart located inside the clean room to/from the cart located outside the clean room. This transfer is necessary to ensure that the cart situated outside the clean environment does not enter and contaminate the sterile clean room. However, such conventional, manual transfers between environments involves a number of risks and difficulties including: (1) the possibility that goods will be dropped or spilled; (2) the possibility that accidental handling of the goods will compromise sterility; (3) the need for additional individuals to assist in the transfer and transport of goods; and (4) can be time-consuming and labor intensive.

SUMMARY OF THE INVENTION

Accordingly, it is an object of the invention to provide a transport that can be used by a single operator to transport goods and equipment. Another object of the present invention is to provide a transport device that can be moved from an uncontrolled environment (e.g., outside a clean room) to inside a controlled environment (e.g., a clean room), and to transport goods from an uncontrolled environment to inside a clean room environment. It is a further object of the invention to provide a cart that has a removable wheel base, such that a single operator can replace the non-sterile wheel base with a sterile wheel base as goods or equipment are transported between an uncontrolled environment and a controlled environment, while preventing the non-sterile wheel base from entering the controlled environment. It is yet another object of the invention to provide a cart that can, in its entirety, withstand the heat and pressure of standard industry autoclaves.

Accordingly, a fully autoclavable cart is provided having a removable wheel base. The cart can be used to transfer goods and equipments on sterile trays from outside the controlled environment to inside the clean room or other controlled environment without requiring the operator to manually transfer the trays. One wheel base can be left outside the clean room, and a second wheel base can be left inside the clean room. The user brings the cart to the clean room entry point or airlock, switches wheel bases to leave the contaminated wheel base outside the clean room and move the cart onto the sterile wheel base located inside the clean room, and continues to move the cart with the goods into the clean room.

These and other objects of the invention, as well as many of the intended advantages thereof, will become more readily apparent when reference is made to the following description, taken in conjunction with the accompanying drawings.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
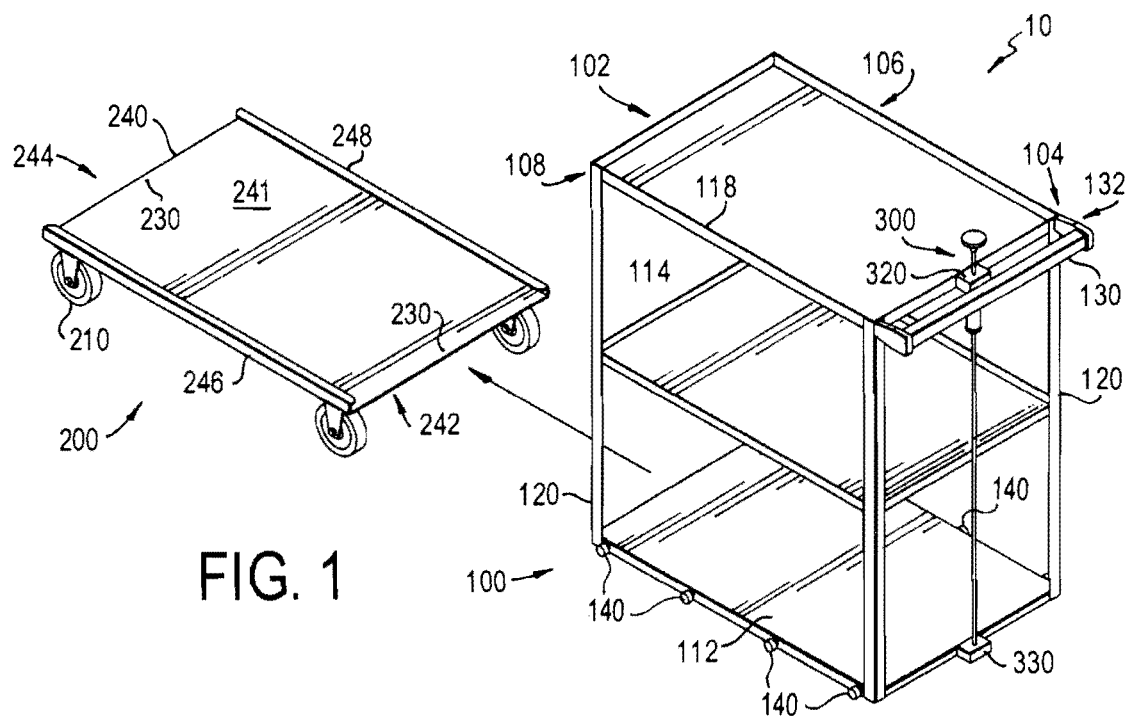
FIG. 1 shows a perspective view of the cart frame with its wheel base removed, in accordance with an embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figures 2A, 2B:
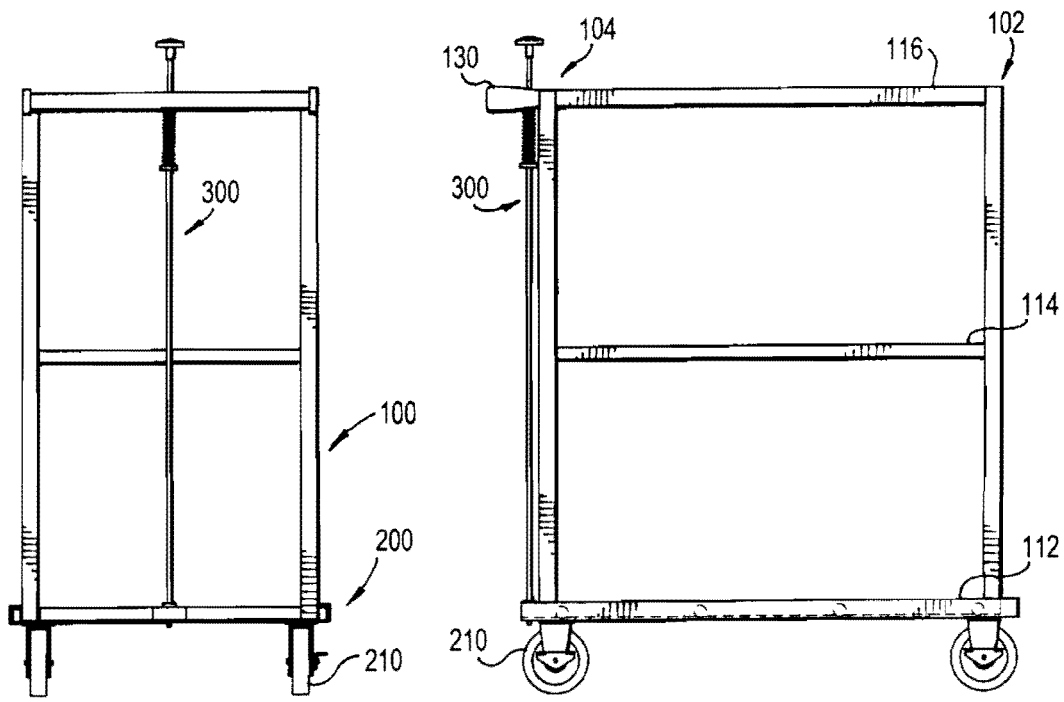
FIG. 2A is a front plan view of the cart with a removable wheel base attached.
FIG. 2B is a side plan view of the cart with a removable wheel base attached.
Figure 2C:
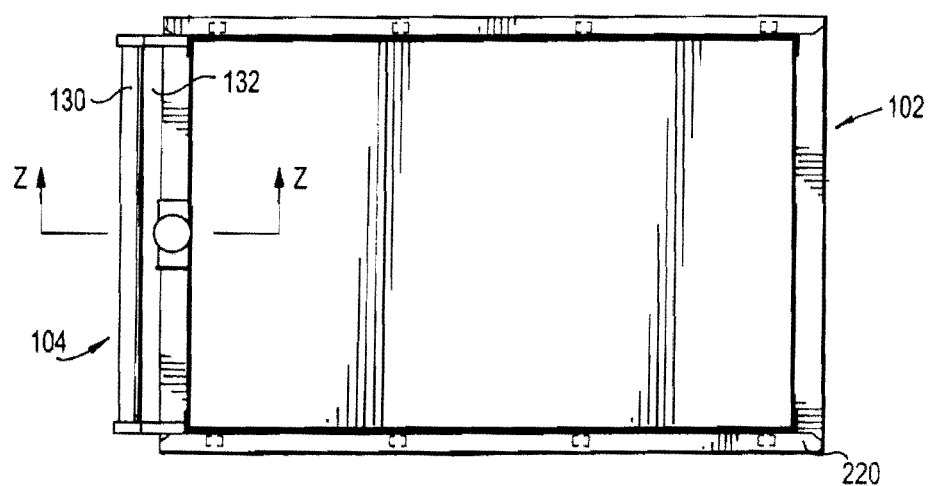
FIG. 2C is a top view of the cart with a removable wheel base attached.

FIGS. 1 and 2 show a transport device such as a cart 10 of the invention in accordance with a non-limiting illustrative embodiment. The cart 10 generally includes a main body or frame 100, a wheel base assembly 200, and a locking mechanism 300 for releasably locking the main body 100 to the wheel base assembly 200. The cart 10 is generally shown as having an elongated, rectangular shape. The entire cart 10, including the frame 100, the wheel base 200, and the locking mechanism 300, are made of a material that can withstand the moisture, heat, and pressure necessary for the entire cart 10 to be able to be autoclaved. Such materials may include, but are not limited to, metals and metal alloys such as nickel, aluminum or stainless steel, resilient plastics such as polypropylene, and Pyrex type glass.

Main Frame 100

As shown, the main frame or body 100 is a rectangular, unitary piece that defines a front transverse side or end 102, a rear transverse side or end 104 and two longitudinal sides 106, 108. The main body 100 has one or more horizontally-extending shelves that are each connected to and supported by four vertical support posts 120. Three shelves are provided in the embodiment shown, including a bottom shelf 112, center shelf 114 and top shelf 116. Each of the shelves 112, 114, 116 carries various items, such as goods and/or equipment. However, it is understood that in this and alternative embodiments of the invention may have a variable number of shelves and support posts 120, though preferably at least one bottom shelf 112 is provided. Each of the shelves 112, 114, 116 can have downwardly-turned edges that form side walls 118, which provide further support for the shelves 112, 114, 116. The shelves 112, 114, 116 can also have upward turned sides that prevent the items being transported from sliding off the shelves.

The main body 100 also includes an elongated handle 130. The handle 130 can be a round elongated tube that ends the entire width of the cart 10. The handle 130 is connected at the rear end 104 of the cart 10 by supports at the two outer sides 106, 108. The handle 130 is spaced apart from the rear end 104 and parallel to the rear end 104 to form a gap 132 between the handle 130 and the rear end 104 of the cart 10. The handle 130 can be substantially at the top of the cart 10 and level with or raised up from (by the supports) the top shelf 116.

Figure 3:
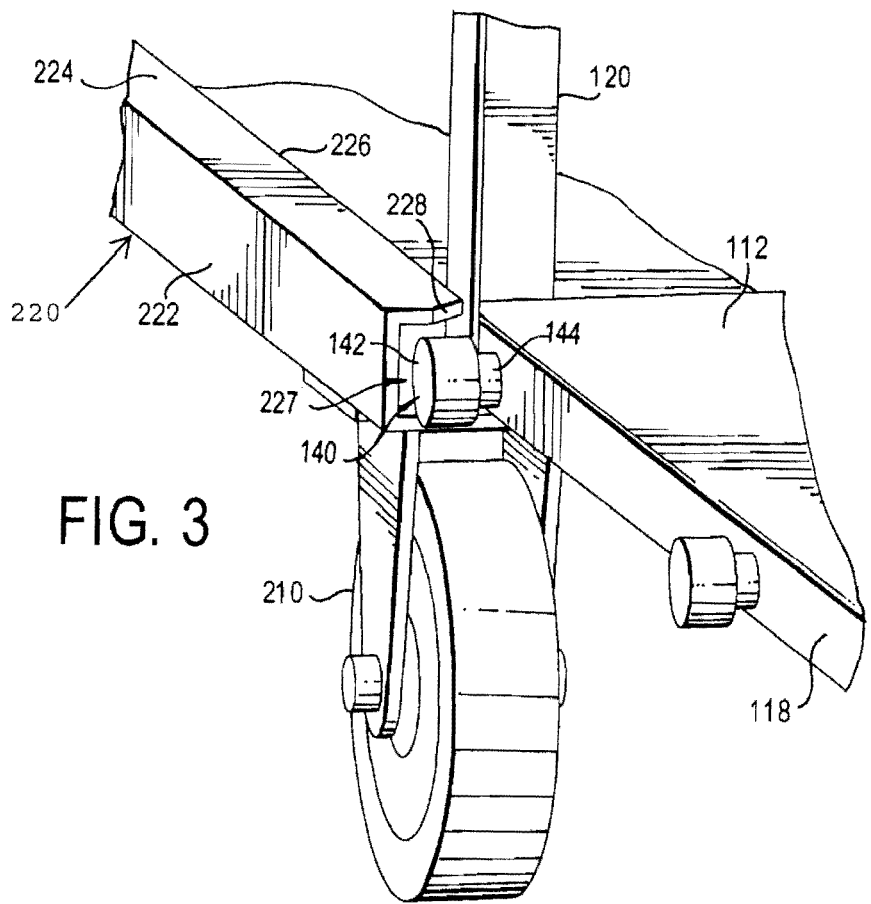
FIG. 3 is an enlarged perspective view of the wheel base wheel assembly of FIG. 1.

Guide wheel assemblies 140 are positioned along the downwardly-turned side walls 118 of the bottom shelf 112. As shown in FIG. 1, four guide wheel assemblies 140 are positioned along the longitudinal side walls 118, spaced apart from each other. Referring to FIG. 3, the wheel assemblies have a wheel 142 and an axle 144. The axle 144 can be a rod that extends through an opening in the side wall 118 and is fastened to the side wall 118 on the opposite side of the wall 118, such as by a bolt or the like. Or, the axle 144 can extend the entire width of the cart 10 so that one axle 144 has two wheels 142 fixed at opposite sides 118 of the cart 10. The guide wheel 142 is relatively wide, and is rotatably fixed to the axle 144 so that the guide wheel 142 rotates freely about the axle 144. The guide wheels 142 extend slightly below the side walls 118, so that they support the weight of the main body 100 when slidably received on the wheel base assembly 200. The wheels 142 rotate in a direction that is parallel to the longitudinal axis of the main body 100, i.e., forward/backwards. Thus, the guide wheels 142 rotate when the main body 100 is slidably received and removed from the wheel base assembly 200. The axis of rotation for each of the rolling-wheels 142 is perpendicular to the side wall 118 and to the axle 144. Though four guide wheel assemblies 140 are shown, any suitable number of guide wheel assemblies can be utilized, including one or more.

Wheel Base Assembly 200

As further shown in FIGS. 1-2, the wheel base assembly 200 includes wheel assemblies 210, two parallel, longitudinal guiderails 220, a lock opening 230 located at both ends of the wheel base 200, and a platform 240. The wheel assemblies 210 include a wheel frame and wheel rotatably coupled with the wheel frame. The wheel frame is connected to the bottom of the platform 240, such that a wheel assembly 210 is provided at each of the four corners of the cart 10 so that the cart 10 can be easily pushed and pulled by the user. At least one of the wheel assemblies 210 has a wheel lock mechanism 250 (FIG. 4A) that prevents movement of the cart 10. In one embodiment, one or more of the wheel assemblies 210 are swivel mounted so that each of the wheel assemblies 210 can rotate three hundred and sixty degrees (360°) about its longitudinal axis so that the cart 10 can be pushed or pulled in any direction.

The platform 240 is sized and shaped to cooperatively receive and mate with the main body 100. Accordingly, the platform 240 is a flat, rectangular, elongated, thin sheet having a traverse rear end 242, a transverse front end 244 and two longitudinal sides 246, 248. The platform 240 has a flat top surface 241 that is a single continuous sheet.

However, the platform 240 can be comprised of one or more elongated slats that extend the full length of the wheel base assembly 200 from the front end 244 to the rear end 242. The platform 240 and wheel base assembly 200 are relatively low to the ground (3-8 inches, depending on the size of the wheels) to provide a stable base upon which the main body 100 can be fixed. Accordingly, the wheel base assembly 200 does not contain any unnecessary elements that might increase its height. So, the wheel base assembly 200 essentially has the wheels and the platform 240, with the wheels attached to the bottom side or surface of the platform 240.

Guiderails 220 are provided at each of the longitudinal sides 246, 248 of the wheel base assembly 200, and are elongated members that extend the entire length of the wheel base assembly 200. The guiderails 220 are best shown in FIG. 3. Each guiderail 220 has an upright portion 222, inwardly turned member 224, and an inner guide edge 226. The upright portion 222 extends perpendicularly upward from the flat top surface 241 and forms the outer edge of the guiderails 220 as well as the outermost edge of the longitudinal sides 246, 248. The inwardly turned member 224 extends perpendicularly inwardly with respect to the wheel base assembly 200 so that the inwardly turned member 224 is substantially parallel to and spaced apart from the top surface 241 of the platform 240. The top surface 241, upright portion 222 and inwardly turned portion 224 are metal (such as steel) walls that form a general U-shape turned on its side. A channel 227 is formed between the inwardly turned member 224 and the top surface 241 of the platform.

As shown, the upright portion 222 spaces the inwardly turned portion 224 apart from the top surface 241 of the platform 240 so that the guide edge 226 is aligned of the top of the rolling-wheel guide assemblies 140 that are attached to the side wall 118 of the main body 100. The guide wheels 142 slide along the guiderails 220 (longitudinally) as the wheels 142 rotate. The rolling-wheel guides 140 support, transport, and guide the main body 100 to slide along the platform 240, and allow the wheel base assembly 200 to slide beneath the main body 100. The rolling-wheel guides 140 allow the main body 100 to slidably engage the wheel base assembly 200 in a longitudinal direction.

The guide wheel assemblies 140 prevent the main body 100 from coming free of the wheel base assembly 200 during use, and to guide the main body 100 when slidably received or removed from a wheel base assembly 200. As shown in FIG. 3, the wheels 142 extend downward slightly below the bottom of the side wall 118. Accordingly, the wheels 142 slide on the top surface 242 of the wheel base assembly 200. The wheels 142 are further received in the channel 227 formed between the top inwardly-turned portion 224 and the top surface 242 of the platform 240. The top member 224 forms a ledge that prevents the wheels 142 from coming free. The top member 224 retains the wheels 142 in the channel 227 and the wheels 142 can only slide forward and backward on the top surface 242 of the platform. Thus, the main body 100 cannot come free of the wheel base assembly 200 by being lifted upward with respect to the wheel base assembly 200, such as if the cart 10 were to tip or be lifted by the users. Rather, the main body 100 can only be separated from the wheel base assembly 200 by unlocking the lock mechanism 300 and sliding the main body 100 forward or backward so that the wheels 142 come out of the ends of the channels 227.

It is noted that the guiderails 200 need not be aligned with the downwardly-turned sides 118, but instead can just cooperatively engage the vertical posts 120 of the main body 100. The guiderails 220 can be formed, for instance, by bending the sides 246, 248 of the platform 240, so that the guiderails are integral with the platform 240. The front and rear corners 228 of the guiderails 220 are beveled to guide the main body 100 inwardly to between the inner edges 226 of the two guiderails 220 as the main body 100 initially slides onto the wheel base assembly 200. In addition, the wheels 142 need not support the weight of the main body 100, but rather can be positioned above the bottom edge of the side walls 118. In this manner, the side walls 118 would slide on the top surface 242 of the platform 240 and the wheels 142 would guide the main body 100 and prevent the main body 100 from separating from the wheel base assembly 200.

Figure 4A:
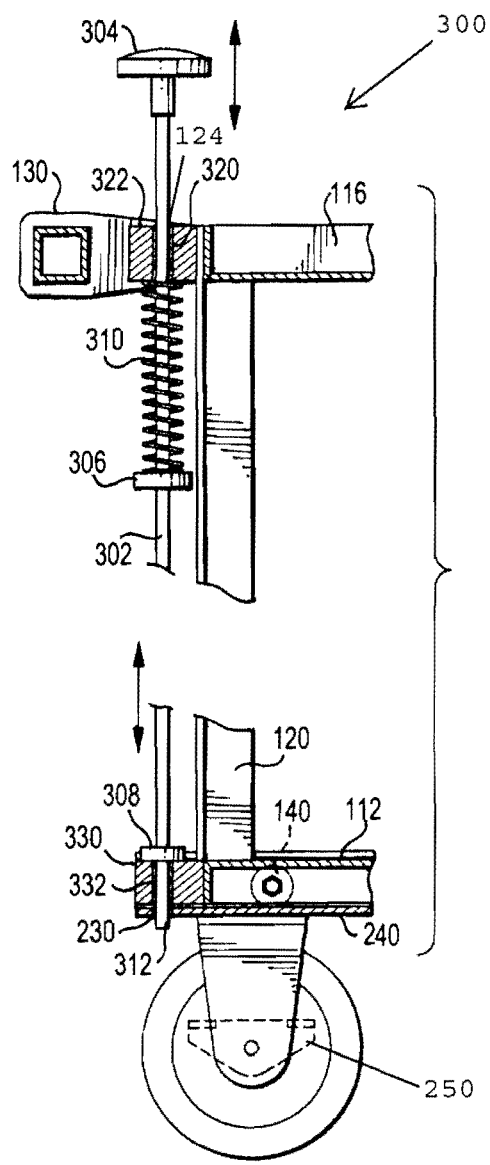
FIG. 4A is a side view of the top rear corner portion of the cart and the rear wheel base locking mechanism, taken along line Z-Z of FIG. 2C, with the locking mechanism in the locked position.
Figure 4B:
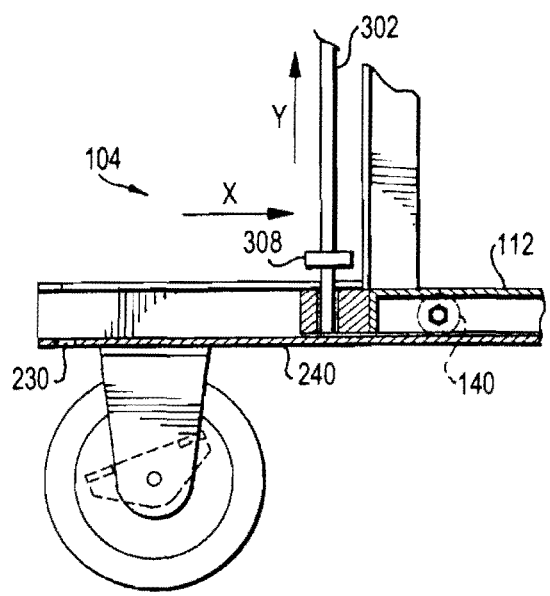
FIG. 4B is a side view of the rear wheel base wheel assembly of FIG. 4A, with the locking mechanism in the unlocked position.

Referring now to FIGS. 4A, 4B, further detail of the locking mechanism 300 is shown. The locking mechanism 300 includes a vertical rod 302, a release knob 304, an upper stop 306, a lower stop 308, a spring 310, and an upper guide hole 124. The vertical rod 302 extends the entire height of the main body 100. A handle such as a knob 304 is positioned at a proximal end of the rod 302. The vertical rod 302 is coupled with the main body 100 of the cart 10 at the rear end 104 of the cart 10. The rod 302 is slidably fastened to the main body 100 by an upper support member 320 and a lower support member 330. The upper support member 320 is fixedly attached at the top portion of the main body 100. In the embodiment shown, the upper support member 320 is fastened to the upper shelf 116 (such as the side wall 118 of the upper shelf 116) and can also be fastened to the inside of the handle 130. The upper support member 320 can be positioned in the gap 132 between the handle 130 and the top shelf 116. The lower support member 330 is fixedly attached at the bottom portion of the main body 100. In the embodiment shown, the lower support member 330 is fastened to the lower shelf 112, such as the side wall 118 of the lower shelf 112.

The upper support member 320 has a central opening or upper through-hole 322 and the lower support member 330 has a central opening or lower through-hole 332. The upper and lower through-holes 322, 332 are slightly larger than the diameter of the rod 302 so that the rod 302 snugly fits in the holes 322, 332. Accordingly, the rod 302 is received in the upper and lower through-holes 322, 332. The holes 332, 332 are large enough so that the rod 302 can freely slide up and down within the holes 322, 332, but not too large to allow the rod 302 to wiggle.

The upper stop member 306 is provided about a top portion of the rod 302 and is fixedly attached to rod 302. The upper stop member 306 is positioned below the upper support member 320 a sufficient distance to permit the spring 310 to be provided between the upper stop member 306 and the upper support member 320. Accordingly, the spring 310 is positioned about the rod 302 between the bottom surface of the upper support member 320 and the top surface of the upper stop member 306. The spring 310 has a diameter that is greater than the diameter of the upper hole 322, but smaller than the width of the upper support member 320. The diameter of the spring 310 is also smaller than the diameter of the upper stop member 306. The spring 310 is slightly compressed so it pushes outwardly against the bottom surface of the upper support member 320 and the top surface of the upper stop member 306.

Thus, the upper stop 306 is fixed to the rod 302 and the rod 302 slides within the upper support member 320, which is fixedly attached to the main body 100. The outwardly-biased spring 310 pushes the rod 302 downwardly (by virtue of pushing downward on upper stop member 306 which is fixed to rod 302) so that a distal end portion 312 of the rod 302 is forced downward to engage into the lock opening 230 of the wheel base assembly 200, as shown in FIG. 4A. The lower stop member 308 is fixedly coupled to the rod 302 at the bottom portion of the rod 302, and prevents the rod 302 from extending too far downward within the openings 332, 230 and hitting the ground or otherwise interfering with operation of the cart 10.

When the rod 302 is received in the lock opening 230 of the wheel base assembly 200, the cart 10 is in a locked position, whereby the wheel base assembly 200 is locked to the main body 100. In the locked position, the main body 100 remains fixed to the wheel base assembly 200 by the cooperative engagement of the locking mechanism 300 in the lock opening 230, as well as by the bottom portion (the bottom shelf 112 and/or support posts 120) being positioned between the guiderail members 220. Accordingly, the wheel base assembly 200 will move together with the main body 100 as the user pushes/pulls the cart handle 130.

The proximal end of the rod 302 and the knob 304 extend up above the top surface of the top shelf 116 and the cart handle 130. The knob 304 is located so that the operator of the cart 100 is able to easily reach and operate the wheel base locking mechanism 300 while still gripping the handle 130.

The user can lift up on the knob 304 in the direction Y against the bias of the spring 310, as shown in FIG. 4B. This action causes the distal end portion 312 of the rod 302 to withdraw from the locking hole 230 of the wheel base assembly 200. In this position, the cart 10 is in an unlocked state or position, whereby the wheel base assembly 200 is no longer locked to the main body 100. The guiderails 220 still prevent the main body 100 from move transversely or laterally with respect to the wheel base assembly 200. However, the main body 100 can slide in a longitudinal direction X (FIGS. 1, 4B). More specifically, the bottom surface of the bottom shelf 112 slides along the top surface 241 of the platform 240. Because both surfaces are smooth metal, the main body 100 can slide without too much difficulty, even when items are loaded on the shelves 112, 114, 116. Thus, although element 112 is referred to as a shelf, it is a flat and sturdy plate that is sufficiently rigid to permit the main body 100 to slide on the platform 240. The platform 240 is also a flat and sturdy plate that is sufficiently rigid to allow the main body 100 to slide on its top surface 241.

The rod 302 cannot be pulled up high enough such that the distal end portion 312 comes out of the opening 332 in the lower support member 330. The rod 302 is prevented from moving upward when the spring 310 is fully compressed between the upper stop member 306 and the upper support member 320. In addition, the lower support member 330 can be made taller, or an additional stop member can optionally be provided on the rod 302 (such as at the distal end 312) to limit the upward movement of the rod 302. Still further, another support member with a through-hole that receives the rod 302 can be affixed to the main body 100 (such as the middle shelf 114) to prevent upward movement of the lower stop member 208 or another stop member (not shown).

Operation of Cart 10

Figure 5A:
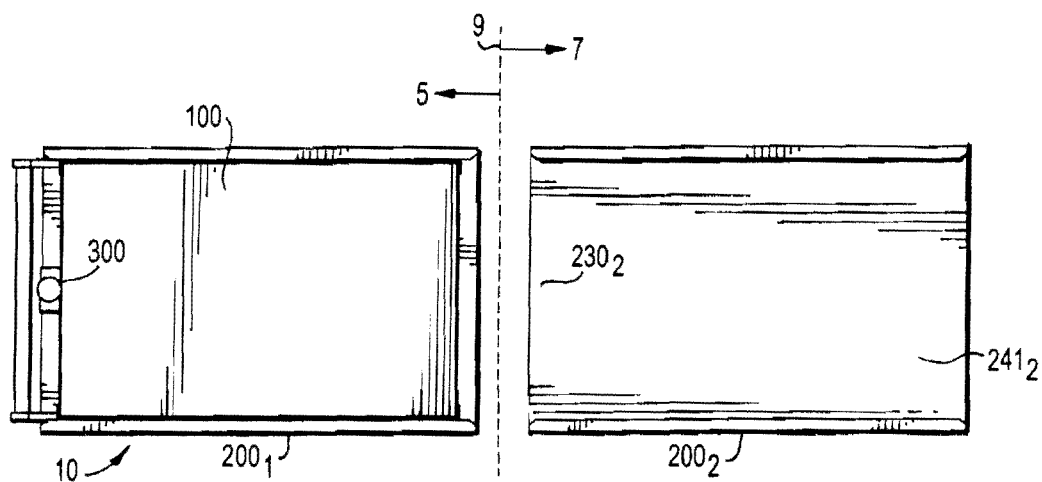
FIG. 5A is a top view as a cart in an uncontrolled environment approaches a wheel base assembly positioned in a controlled environment.
Figure 5B:
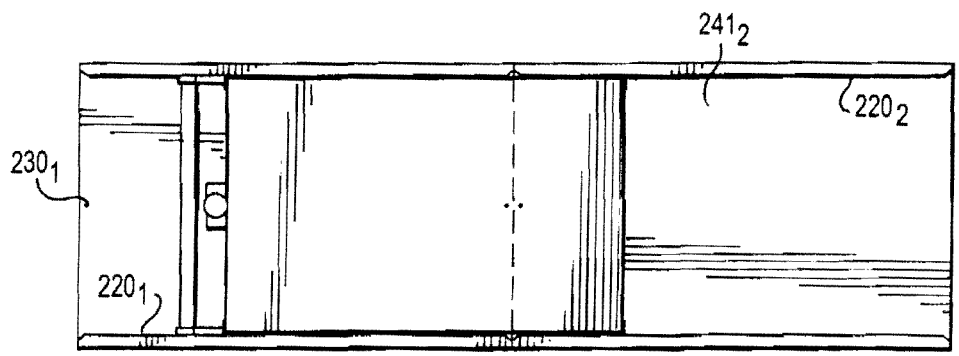
FIG. 5B is a top view as a cart moves between an uncontrolled environment and a controlled environment, replacing its non-sterile wheel base with a sterile wheel base.
Figure 5C:
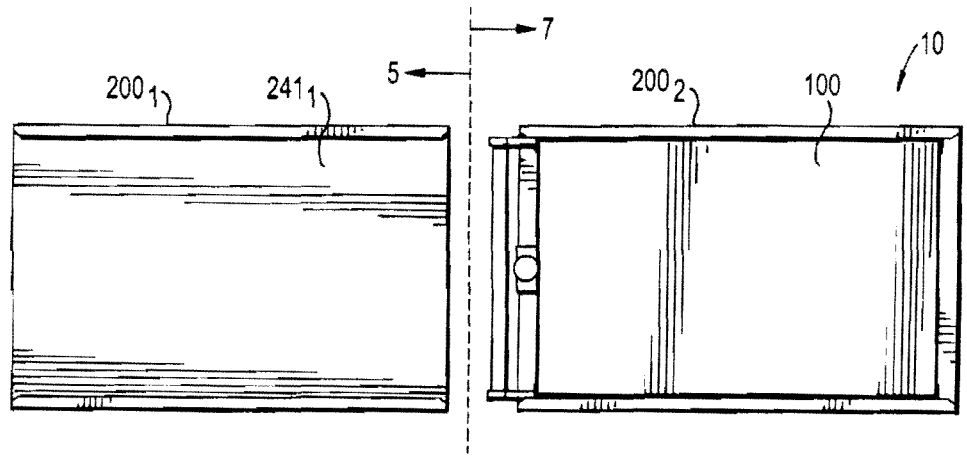
FIG. 5C is a top view of a cart completely within a controlled environment, after having replaced its non-sterile wheel base with a sterile wheel base.

Turning to FIGS. 5A, 5B, 5C, operation of the cart 10 is shown. In this non-limiting illustrative example, the cart 10 is moved from an uncontrolled environment 5 (e.g., outside a clean room) to a controlled environment 7 (e.g., inside a clean room) by a single operator. The border or boundary 9 is shown separating the controlled environment 7 and uncontrolled environment 5. The boundary 9 can be, for instance, the entrance to an airlock located outside a clean room. Or, the boundary 9 can be inside the airlock and outside the entrance to the clean room. Or, the boundary 9 can be between two clean rooms having different particulate levels. For instance, the cart 10 can be moving from an ISO 14644-1 class clean room to an ISO 14644-2 class clean room. Items (such as goods, product and/or equipment) can be carried on the shelves 110 of the cart 10. These items may be sterile and exposed or sealed inside sealed packaging such as bags. FIGS. 5A-5C illustrate an operator transporting those items into a clean room or other controlled environment without contamination to the items or to the controlled environment.

Starting with FIG. 5A, the cart 10 is located in the uncontrolled environment 5 and is brought to the boundary 9. The cart 10 includes both a main body 100 and a first wheel base assembly $200_1$, as shown in the fully assembled embodiments of FIGS. 2A-2C. At the same time, a second wheel base assembly $200_2$ is located on the other side of the boundary 9, inside the controlled environment 7. Accordingly, there are two wheel base assemblies 200: a first assembly $200_1$ that is attached to the main body 100 in the uncontrolled environment 5, and a second assembly $200_2$ that is by itself in the controlled environment 7. The wheels 210 on the second wheel base assembly $200_2$ are in the locked position, so that the second wheel base assembly $200_2$ cannot move.

At this point, the operator pushes the cart 10 using the handle 130 up to the boundary line 9, so that the first wheel base assembly $200_1$ comes into contact with the second wheel base assembly $200_2$. The user then locks the wheels 210 of the first wheel base assembly $200_1$ so that the first wheel base assembly $200_1$ cannot move. The first and second wheel base assemblies $200_1$, $200_2$ are identical, so their respective platforms $240_1$, $240_2$ are the same height as one another. The user aligns the first wheel base assembly $200_1$ with the second wheel base assembly $200_2$ so that the sides 246, 248 substantially align with each other. A guide member can optionally be provided on the front end 244 of the first wheel base assembly $200_1$ and/or the rear end 242 of the second wheel base assembly to (individually or jointly) assist the user in aligning the first wheel base assembly $200_1$ with the second wheel base assembly $200_2$.

Accordingly, the first wheel base assembly $200_1$ is aligned with the second wheel base assembly $200_2$, and the main body 100 (together with any items it is carrying) is ready to be moved from the first wheel base assembly $200_1$ to the second wheel base assembly $200_2$. Accordingly, the user lifts up on the knob 304 of the locking mechanism 300 (FIG. 4A) against the force of the spring 310, which withdraws the distal end portion 312 from the first lock opening $230_1$, thereby unlocking the main body 100 from the first wheel base assembly $200_1$. The extent to which the operator may lift the knob 304 is limited by the upper stop 306, which compresses the spring 310 to its mechanical limit between the upper stop 306 and the surface of the upper support member 320 surrounding the upper guide hole 322.

In the unlocked position, the user can push on the handle 230 so that the main body 100 slides along the top surface $241_1$ of the platform 240 of the first wheel base assembly $200_1$ and onto the top surface $241_2$ of the platform 240 of the second wheel base assembly $200_2$, as shown in FIG. 5B. As the main body 100 is slid onto the second wheel base assembly $200_2$, the first and second guiderails $220_1$, $220_2$ guide the main body 100 in the longitudinal direction X (FIG. 4B). The support posts 120 may come into contact with the beveled corners 228 of the second guiderail $220_2$, and the beveled corners 228 direct the main body 100 to come within the second guiderails $220_2$. Once the main body 100 is pushed slightly off the first wheel base assembly $100_1$, the rod 302 is no longer aligned with the lock opening 230, so the user can release the knob 304. The distal end 312 will be pushed back down by the force of the spring 310, and will ride along the top surfaces 241$_1$, 241$_2$ of the respective platforms 240. A catch can be optionally provided to hold the knob in the upright position so that the user need not hold it.

The user continues to push on the handle 130 until the main body 100 is fully positioned on the second wheel base assembly 200$_2$ inside the controlled environment 7. Because the wheels on the second wheel base assembly 200$_2$ are locked, the wheel base assembly 200$_2$ remains stationary and does not move as the main body is being slid onto it. Here, it is noted that although both the first and second wheel bases 200$_1$, 200$_2$ are locked, only the second wheel base 200$_2$ needs to be locked. However, the first wheel base 200$_1$ can also be locked to further prevent motion of the first wheel base 200$_1$ during the transfer operation. And, the first wheel base 200$_1$ will then be locked and ready to accept the main body 100 again when the user exits the controlled environment 7. Once the main body 100 is fully received on the second wheel base assembly 200$_2$, the rod 302 will be aligned (by the inner edges 226 of the guiderails 220$_2$) with the lock opening 230$_2$ and will automatically enter the lock opening 230$_2$ under the outward (downward) force of the spring 210.

At that point, the main body 100 is locked to the second wheel base assembly 200$_2$ (with the sterile wheels) inside the controlled environment 7, and the first wheel base assembly 200$_1$ (with the unsterile wheels) remains in the uncontrolled environment 5. As shown in FIG. 5C, the wheels of the second wheel base assembly 200$_2$ can then be unlocked by the user, and the cart 10 (with the main body 100 and the second wheel base assembly 200$_2$) can be maneuvered inside the clean room 7 so that the items can be delivered to the appropriate location inside the clean room 7. It is noted that during the transfer operation of FIGS. 5A-5C, the items remain on the shelves 112, 114, 116 of the cart 10 and need not be removed. In addition, the main body 100 never touches the ground, but instead moves directly from the first platform surface 240$_1$ to the second platform surface 240$_2$.

The process described can also be executed identically in reverse, i.e., when the cart 10 travels from the controlled environment 7 to the uncontrolled environment 5. At all times, however, the sterile and non-sterile wheel bases remain sequestered in their respective environments, preventing any cross-contamination of particulate matter while the cart 10 moves between these environments. The wheel bases are substantially identical so that they are exchangeable with one another and the frame 100 can be readily moved from one wheel base assembly to another without having to reconfigure the main body 100. In addition, openings 230 are located at both the front and rear ends 244, 242 of the wheel base assemblies 200, so that the main body 100 can be placed on the wheel base assembly 200 from either direction.

Thus, the cart 10 enables items to be carried on the shelves 112, 114, 116. Those items remain on the shelves 112, 114, 116 as the cart 10 is moved between an uncontrolled environment and a controlled environment. In this way, a user need not manually remove the items from the cart to bring the items into the clean room, while leaving the cart outside of the clean room. And, the wheels that are used in the uncontrolled environment do not enter the controlled environment. Rather, the wheels used in the controlled environment remain inside the controlled environment and do not leave the controlled environment. Accordingly, the cart wheels are not introducing particles into the controlled environment.

As discussed and shown above, a single locking mechanism 300 is provided that is mostly located on the main body 100 and only an opening 230 is needed on the wheel base assembly 200. However, any suitable number and configurations can be provided. For instance, multiple locking mechanisms can be provided, located at one or more sides 106, 108 or ends 102, 104 of the main body frame 100. And, the locking mechanism can include a fastener or mating locking mechanism on the wheel base assembly that cooperatively engages a locking mechanism on the main body 100. Still further, the locking mechanism 300 need not have a long rod 302, but can have a short rod with the knob just above the bottom shelf 112 so that the user must bend down to lift the knob.

In addition, the invention is shown as having a bottom shelf 112 that slides on the top surface 241 of the platform 240, so that any items on the shelf 112 are moved onto the new wheel base assembly. However, other variations can be provided. As mentioned above, the platform 240 can be slats or the like. And, instead of a bottom shelf 112, the posts 120 can have wheels. Or, elongated longitudinal supports can be provided with roller bearings that engage mating roller bearings on the wheel base assembly (such that guiderails are not needed).

Another feature of the invention is that the entire cart 10 is made of materials that can be autoclaved. Thus, the entire cart 10 and any items it carries, can be placed in an autoclave and sterilized. Still further variations of the cart 10 can be provided within the spirit and scope of the invention. Although the invention is described as having a wheel base assembly 200 that is completely separate from the main body 100, other embodiments of the invention can be provided within the invention. For instance, the main body 100 can have multiple sets of interchangeable wheels, so that one set of wheels is used in the clean environment and one set of wheels is used outside the clean environment. The wheels can be separately removable so that each wheel is replaced one at a time, or the two front wheels and two rear wheels can each be coupled together so that the front wheels can be replaced at one time and the rear wheels can be replaced at one time. Or the wheels can remain fixed to the main body and operated by a lever to raise one set of wheels and lower the other set of wheels. For instance, a wheel assembly can have two wheels each fixed to a pivot plate that pivots between one of the wheels being lower and the other wheel raised.

Storage/Transport Cart or Rack 600, 700

Figure 6A:
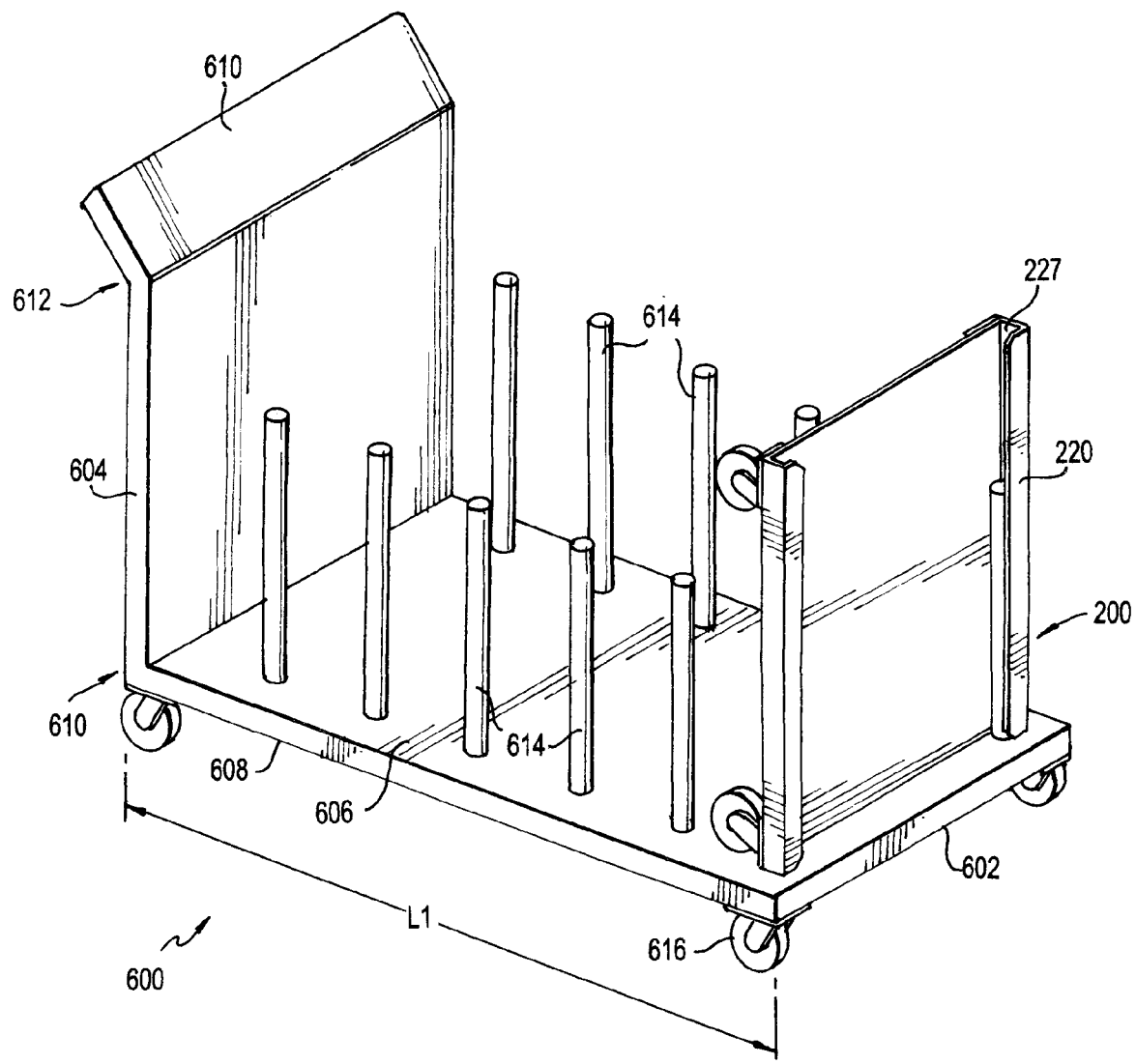
FIG. 6A is a side perspective view of a rack used to transport the wheel base assemblies of FIG. 1, in accordance with an embodiment of the invention.
Figure 6B:
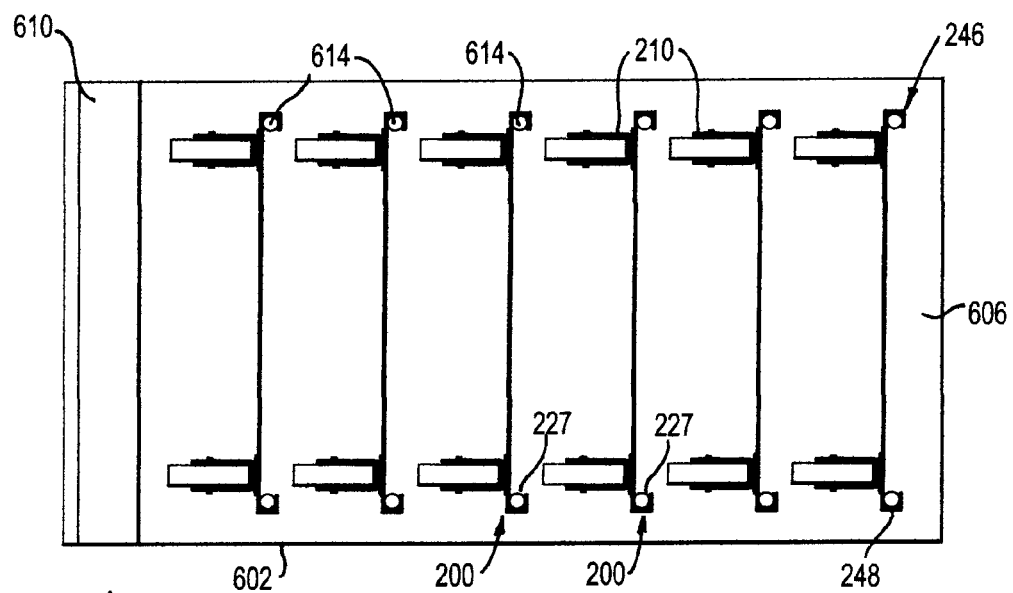
FIG. 6B is a top view of the rack of FIG. 6A.
Figure 6C:
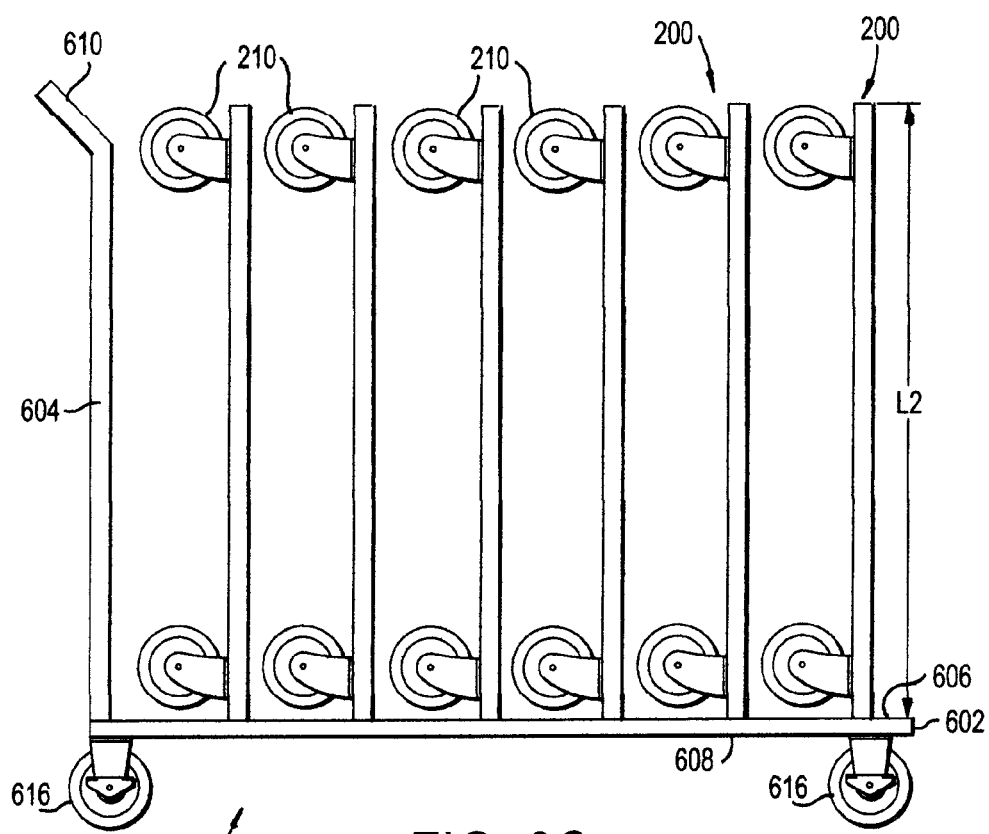
FIG. 6C is a side view of the rack of FIG. 6A.

Another feature of the invention is illustrated in FIGS. 6A-6C. As shown in FIG. 6A, the invention includes a wheel base transport cart or rack 600 that may be used to store and/or transport one or more wheel base assemblies 200 to and retain in an autoclave. The rack 600 is generally formed of a bottom portion 602 and at least one handle assembly 604. The bottom portion 602 may be formed of a flat, rectangular, elongated, plate that has an upper surface 606 and a bottom surface 608. The bottom portion 602 of the rack 600 is sized and configured to accommodate multiple wheel base assemblies 200 and to allow it to fit within an autoclave. The handle assembly 604 may be formed of poles or rods 612 and a handle 610. The poles 612 may extend perpendicularly (as shown in FIG. 6A) or at an angle from the upper surface 606 of an end 610 of the bottom portion 602. The poles 612 and the handle 610 are formed integrally with or attached to each other. As shown in FIG. 6C, the handle 610 is formed integrally with the poles 612 and extends at an angle from the top of the poles 612. The handle 610 allows a user to push the rack 600.

According to one embodiment, the bottom portion 602 and handle assembly 604 (including handle 610 and poles 612) are formed of material which may be autoclaved, including, but not limited to, metals and metal alloys such as nickel, aluminum, or stainless steel, resilient plastics such as polypropylene, and Pyrex®-type glass (i.e., low-thermal-expansion borosilicate glass). Thus, the entire rack 600 (and any wheel base assemblies 200 being held by the rack 600) may be autoclaved.

As shown in FIG. 6A, the rack 600 includes a plurality of poles or posts 614 extending upwardly from the upper surface 606 of the bottom portion 602 of the rack 600. The posts may be formed integrally with the bottom portion 602 of the rack 600, or they may be coupled to the upper surface 606 of the bottom portion 602 by pins, screws, or the like. The posts 614 may have a circular cross-sectional shape or may have any other cross-sectional shape that allows them to securely hold the wheel base assemblies 200 and fit within the channels 227 of the guiderails 220, such as a square, oval or octagonal cross-sectional shape. In one embodiment, the posts 614 are configured in pairs along a length ($L_1$) of the bottom portion 602 of the rack 600 with each pair in a row that extends transverse across the rack 600. Each post 614 of the pair is spaced apart from the other post 614 such that a first post 614 of a pair engages a channel 227 of the guiderail 220 of the wheel base assembly 200 on one longitudinal side 246, while the other of the posts 614 of the pair engages the channel 227 of the guiderail 200 on the other longitudinal side 248 of the wheel base assembly 200. The posts 614 have a height that is sufficient to securely hold the wheel base assemblies 200 in place, such as at least half the length ($L_2$) of the wheel base assembly 200.

While FIG. 6A depicts a total of twelve posts 614 to accommodate six wheel base assemblies 200, the invention is not particularly limited to any number of posts 614. The rack 600 is designed to allow for the autoclaving of multiple wheel base assemblies 200 at a time, so a plurality of posts 614 is preferred. Like the bottom portion 602 and handle assembly 604 of the rack 600, the posts 614 are also formed of materials which may be autoclaved, such as those discussed herein.

The posts 614 are configured to hold each of the wheel base assemblies 200 in a vertical position on the rack 600. As shown in FIGS. 6A and 6B, the posts 614 are positioned within the channels 227 of the longitudinal guiderails 220 of either longitudinal side 246, 248 of the wheel base assembly 200, such that the flat top surface 241 (see FIG. 1) of the wheel base assembly 200 is oriented perpendicularly to the bottom portion 602 of the rack 600. The posts 614 have a cross-sectional size and shape that allows them to fit within the channels 227 snugly, so as to secure the wheel base assemblies 200 in place, without having to force the wheel base assemblies 200 down into the posts 614. The wheel base assemblies 200 should be secure enough that they may be moved around on the rack 600 without tipping or falling off. As shown in FIG. 3, each guiderail 200 is formed of an inwardly turned member 224 that engages the post 614 and prevents the wheel base assembly 200 from moving forward or backward on the rack 600, and an upright portion 222 that engages the post 614 and prevents the wheel base assembly 200 from moving side-to-side on the rack 600. In this way, the wheel base assemblies 200 are prevented from moving forward or backward or side-to-side on the rack 600 so that they do not come free.

The wheel base assemblies 200 are arranged vertically on the rack 600 so that the rack 600 may accommodate multiple wheel base assemblies 200 (as shown in FIG. 6C) without requiring a rack 600 that is too large to be easily moveable by the user or to fit within an autoclave. The wheel base assemblies 200 are positioned on the rack 600 parallel to one another in a stacked relationship. In operation, the user will slide each of the wheel base assemblies 200 down onto the rack 600 by aligning the openings of the channels 227 of the guiderails 220 on each longitudinal side 246, 248 with two adjacent posts 614. The posts 614 may be guided down into the channels 227 by the beveled front and rear corners 228 (see FIG. 3) of the guiderails 220. The top of the posts 614 can also be rounded or tapered to further guide the wheel base assembly 200 onto the posts 614. As shown in FIG. 6C, the wheels 210 of the wheel base assembly 200 may face the handle assembly 604 of the rack, but they may also be oriented to face in the opposite direction.

The rack 600 may include a plurality of wheels 616 coupled to the bottom surface 608 of the bottom portion 602, so that the rack 600 may be physically moved from one location to another, such as from an outside environment into an autoclave or clean room environment. The wheels 616 may be positioned at each corner of the bottom surface 602 of the bottom portion 602 to ensure stability of the rack 600.

In this way, the rack 600 is sized and configured to store, hold and transport multiple wheel base assemblies 200, so as to efficiently autoclave multiple wheel base assemblies 200 simultaneously. However, the rack 600 may also be sized and configured to transport other devices for simultaneously autoclaving.

Figure 7A:
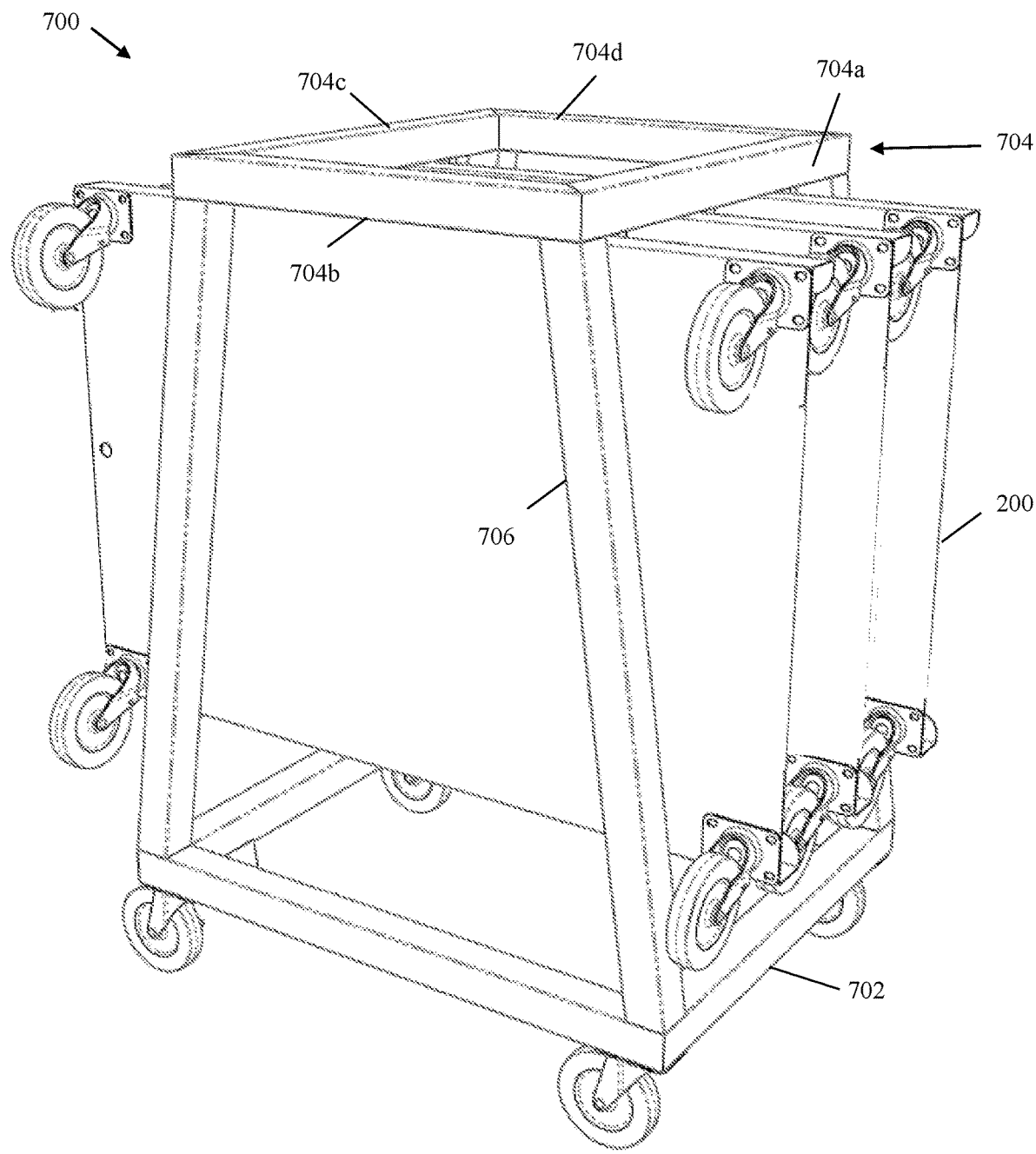
FIG. 7A is a perspective view of the rack in accordance with an alternative embodiment of the invention.
Figure 7B:
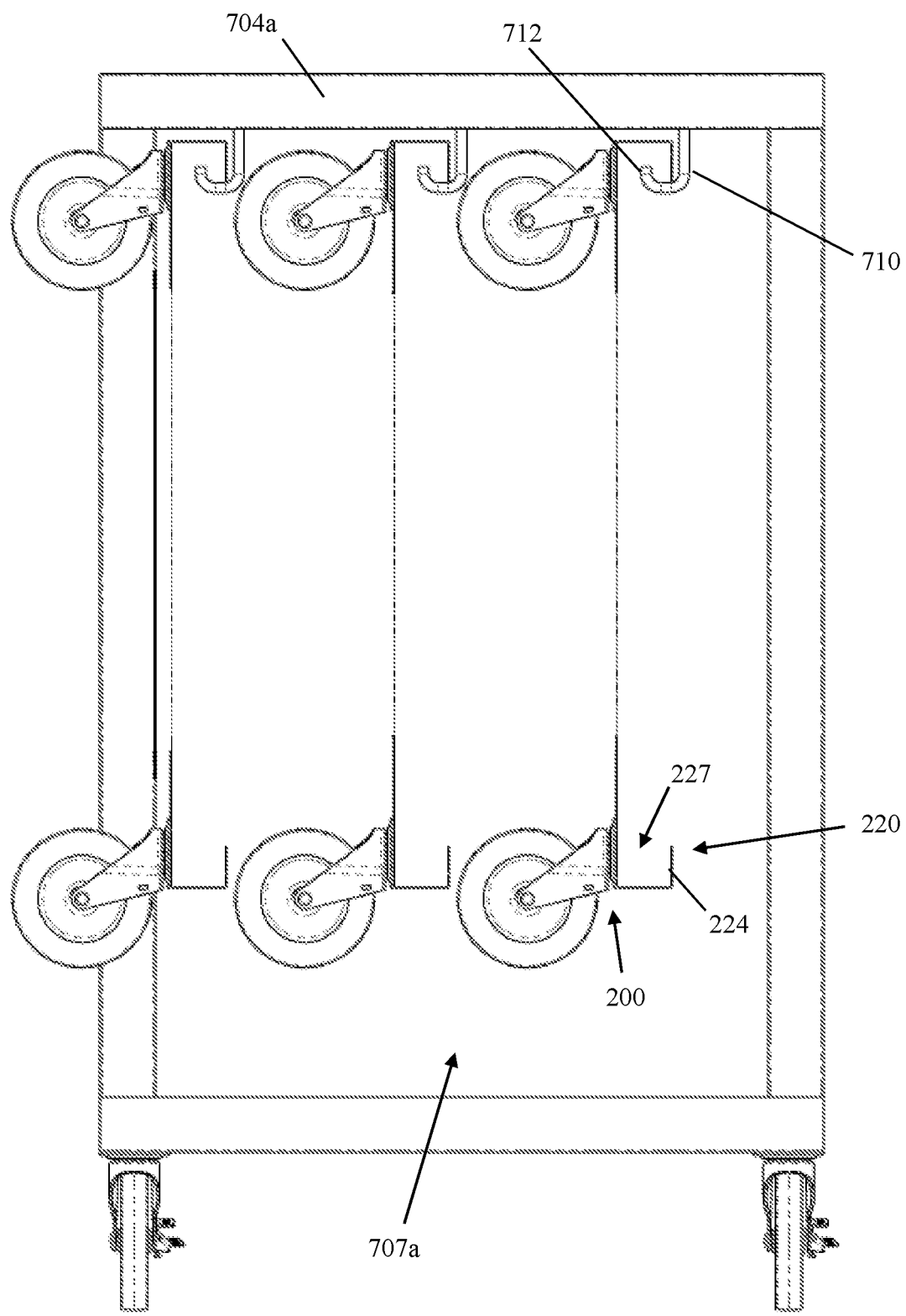
FIG. 7B is a front view of the rack of FIG. 7A.
Figure 7C:
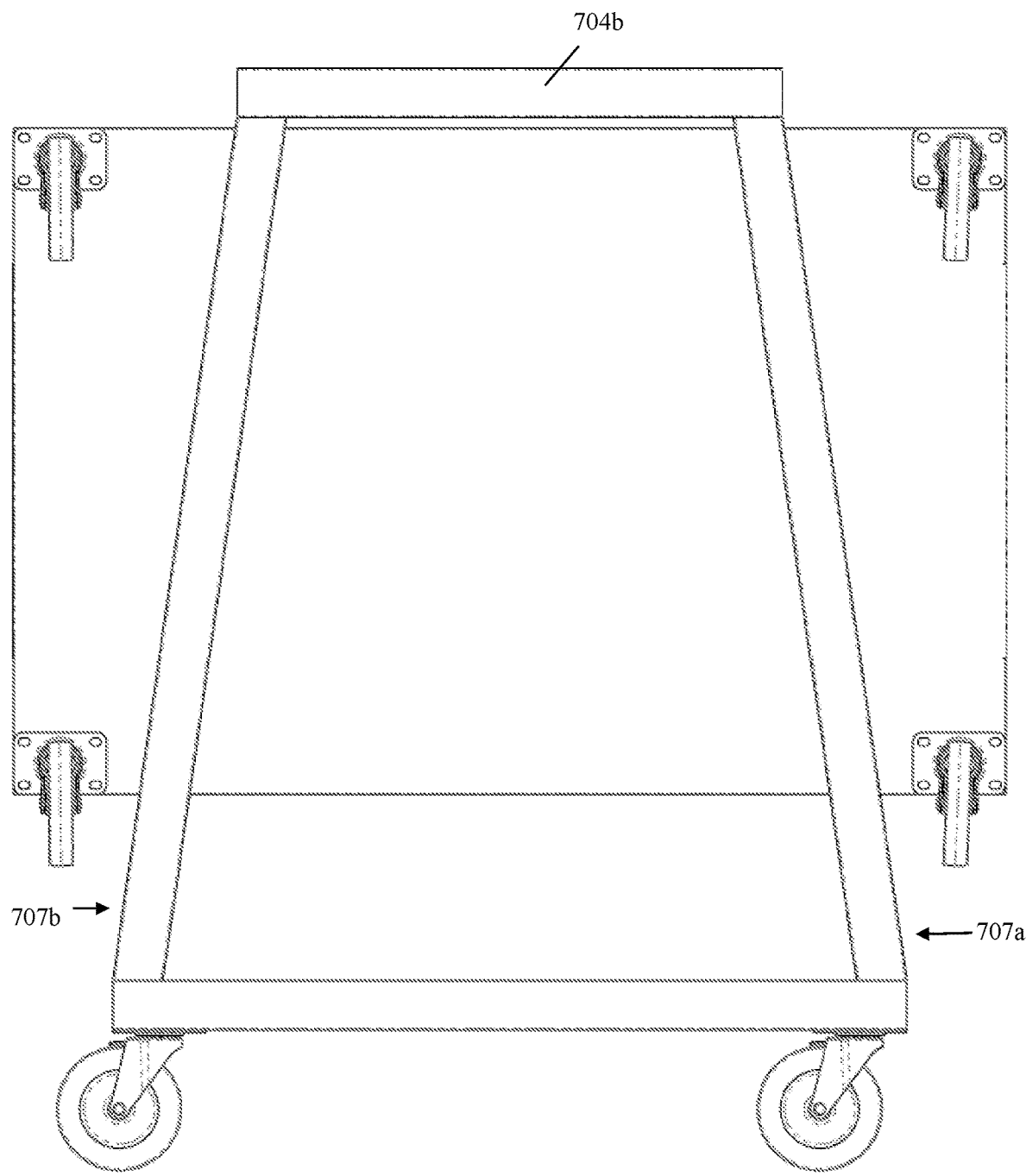
FIG. 7C is a side view of the rack of FIG. 7A.

Turning to FIGS. 7A-7C, a rack 700 is shown in accordance with an alternative embodiment of the invention. The cart or rack 700 may be used to store and/or transport one or more wheel base assemblies 200 to and retain in an autoclave. The rack 700 is sized and configured to accommodate multiple wheel base assemblies 200 and to allow it to fit within an autoclave. According to one embodiment, the entire rack 700 are formed of material which may be autoclaved, including, but not limited to, metals and metal alloys such as nickel, aluminum, or stainless steel, resilient plastics such as polypropylene, and Pyrex®-type glass (i.e., low-thermal-expansion borosilicate glass). Thus, the entire rack 700 can be autoclaved, together with any wheel base assemblies 200 being held by the rack 700.

The rack 700 has a frame with a base frame portion 702, top frame portion 704, and four side support poles 706. The bottom and top frame portions 702, 704 can each be formed by four elongated support members that are connected together in a square shape having an open center. Thus, the top frame portion 704 has a front support member 704a, rear support member 704c, and side support members 704b, 704d. Alternatively, the bottom and/or top frame portions 702, 704 can be solid plates.

As best shown in FIG. 7C, the top frame portion 704 can be smaller than the bottom frame portion 702, and the side support poles 706 can extend substantially vertically upward and angled inward slightly to connect each corner of the bottom frame portion 702 to the respective corner of the top frame portion 704. The wider base frame portion 702 provides greater stability, and the smaller top frame portion 704 allows for easier insertion and removal of the wheel base assemblies 200. The support poles 706 forms an internal space having a front opening 707a and a rear opening 707b.

As shown in FIG. 7B, one or more hooks 710 are provided. The hooks 710 are coupled to the bottom of the top frame portion 704. In one embodiment, a plurality of hooks 710 are coupled to the front and rear support members 704a, c, and are spaced from one another so that a wheel base assembly 200 can fit between the neighboring hooks 710. Each hook 710 on the front support member 704a are aligned with a respective hook 710 on the rear support member 704c, to form a respective pair. The hooks 710 can have a general J-shape so they extend downward from the supports 704a, 704c, then curve back upward and form an upwardly turned lip 712. The hooks 710 extend substantially parallel to a central longitudinal axis of the front and rear supports 704a, 704c.

In this manner, one or more wheel base assemblies 200 can be releasable engaged with the cart 700 by hanging each wheel base assembly on a respective pair of hooks 710. More specifically, the hooks 710 can releasably engage one of the guiderails 220 of the wheel base assembly 200, so that the assembly 200 hangs vertically sideways. The hooks 710 hook onto the inwardly turned top member 224 so that the inner guide edge 226 rests on the hook 710. When the wheel base assembly 200 is positioned on the hooks 710, the hook lip 712 extends upward into the guide channel 227, so that the wheel base assembly 200 cannot be removed without the user lifting the wheel base assembly upward to come over the lip 712.

Thus, the rack 700 holds multiple wheel base assemblies 200 at one time, with the wheel base assemblies 200 extending substantially parallel to one another, and perpendicularly on the rack relative to the bottom frame portion. As shown in FIG. 7B, the wheel base assemblies 200 are between the two sides of the rack 700. As shown in FIG. 7C, the wheel base assemblies 200 extend outward beyond the front and rear of the cart 700 so that the assemblies 200 can be grasped by a user and easily hanged and removed from the hooks 710. In operation, the user grabs an assembly 200 about the guiderail 220 and can insert his fingers into the channel 227. The user then inserts the assembly 200 in through the front or rear opening 707a, b of the rack between the respective front or rear support poles 706, then lifts the assembly 200 over the lip 712 and lets the assembly down onto the hook 710. The process is reversed to remove the assembly 200 from the rack 700.

The rack 700 may include a plurality of wheels 716 coupled to the bottom surface of the bottom frame portion 702, so that the rack 700 may be physically moved from one location to another, such as from an outside environment into an autoclave or clean room environment. The wheels 716 may be positioned at each corner of the bottom frame portion 702 to ensure stability of the rack 700. The user can pull and/or push the rack 700 by grabbing one of the support members 704a, b, c, d.

In this way, the rack 700 is sized and configured to store, hold and transport multiple wheel base assemblies 200, so as to efficiently autoclave multiple wheel base assemblies 200 simultaneously. However, the rack 700 may also be sized and configured to transport other devices for simultaneously autoclaving.

Accordingly, the foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A transport device comprising:
   a main body having a handle, a bottom and a plate at the bottom of the main body;
   an interchangeable wheel base separate from the main body, the interchangeable wheel base having at least one wheel and a top surface, wherein an opening is formed in the top surface; and
   a locking mechanism coupled to the main body and including:
   a rod; and
   a spring configured to cause the rod to engage the opening in the top surface automatically in response to alignment of the rod and the opening.

2. The transport device of claim 1, wherein the locking mechanism further includes a knob attached to the rod.

3. The transport device of claim 1, wherein the transport device is fully autoclavable.

4. The transport device of claim 1, wherein the transport device comprises a cart.

5. The transport device of claim 1, further comprising at least one guide wheel coupled with the plate for slidably supporting the main body on the top surface of the interchangeable wheel base.

6. A cart for transporting items between a controlled environment and an uncontrolled environment, the cart comprising:
   a frame having a bottom surface, at least one shelf, and support posts coupling the bottom surface with the at least one shelf;
   a wheel base separate from the frame, the wheel base having a flat top surface including two parallel guiderails, the top surface configured to slidably receive the bottom surface of the frame, wherein an opening is formed in the top surface; and
   a locking mechanism configured to releasably couple the frame with the wheel base and including:
   a rod; and
   a spring configured to cause the rod to engage the opening in the top surface automatically in response to alignment of the rod and the opening;
   wherein the bottom surface has a downwardly-turned side which includes at least one guide wheel coupled therewith for slidably supporting the frame on the flat top surface of the wheel base along the two parallel guiderails.

7. The cart of claim 6, wherein the wheel base has an upturned side and a top ledge forming a channel, wherein the at least one guide wheel is slidably received in the channel.

8. A rack for storage or transportation of a transport device comprising:
   a frame having a top frame portion and a bottom frame portion;
   a plurality of posts, each post extending upwardly from a corner of the bottom frame portion and coupled to a respective corner of the top frame portion, the top frame portion and the bottom frame portion each having a front post and a rear post; and
   a plurality of hooks extending downward from the top frame portion and configured to receive a plurality of transport devices, the plurality of hooks including a first hook coupled to the front post of the top frame portion and a second hook coupled to the front post of the bottom frame portion, the first hook aligned with the second hook to form a pair, the pair configured to receive a first transport device.

9. The rack according to claim 8, wherein the rack is formed of autoclavable materials.

10. The rack according to claim 9, further comprising a plurality of wheels coupled to the bottom frame portion.

11. A rack for storage or transportation of a transport device comprising:
a frame having a top frame portion and a bottom frame portion;
a plurality of posts, each post extending upwardly from a corner of the bottom frame portion and coupled to a respective corner of the top frame portion; and
a plurality of hooks extending downward from the top frame portion and configured to receive a plurality of transport devices, wherein the plurality of transport devices each comprise a wheel base having a guiderail located on one side, wherein at least one of the plurality of hooks engages the guiderail to secure the transport device to the rack.

12. A cart for transporting items between a controlled environment and an uncontrolled environment, the cart comprising:
a frame having a bottom surface, at least one shelf; and support posts coupling the bottom surface with the at least one shelf;
a wheel base separate from the frame, the wheel base having a flat top surface which slidably receives the bottom surface of the frame;
an opening in the flat top surface of the wheel base; and
a locking mechanism configured to releasably couple the frame with the wheel base, wherein the locking mechanism comprises:
a rod coupled with the frame; and
a spring configured to cause the rod to engage the opening in the top surface automatically in response to alignment of the rod with the opening to releasably couple the frame with the wheel base, wherein the bottom surface has a downwardly-turned side which includes at least one guide wheel coupled therewith for slidably supporting the frame on the flat top surface of the wheel base.

13. A cart for transporting items between a controlled environment and an uncontrolled environment, the cart comprising:
a frame having a bottom surface, at least one shelf, and support posts coupling the bottom surface with the at least one shelf;
at least one wheel base separate from the frame, the at least one wheel base having a flat top surface which slidably receives the bottom surface of the frame along two parallel guideways attached to the at least one wheel base, wherein the top surface of the wheel base includes an opening; and
a locking mechanism including:
a rod coupled to the frame; and
a spring configured to cause the rod to engage the opening automatically in response to alignment of the rod with the opening to releasably couple the frame with the wheel base.

14. The cart of claim 13, comprising a first wheel base and a second wheel base that is exchangeable with the first wheel base, and wherein the frame is configured to be slidably exchanged between the first wheel base and the second wheel base.

15. The transport device of claim 1, wherein the handle is attached to an upper support member of the main body and the rod extends through a hole in the upper support member.

16. The transport device of claim 15, wherein:
an upper stop member is attached to the rod
the spring is wider than the hole in the upper support member;
the upper stop member is wider that the spring; and
the spring is positioned between the upper support member and the upper stop member.

17. The transport device of claim 16, wherein:
a lower stop member is attached to the rod; and
the lower stop member is wider than the opening in the top surface of the interchangeable wheel base.

* * * * *